Feb. 7, 1956  C. ZELLWEGER  2,733,567

FLUIDTIGHT WATCH CROWN CONSTRUCTION

Filed March 12, 1953

INVENTOR
Conrad Zellweger.

BY

ATTORNEY

United States Patent Office 2,733,567
Patented Feb. 7, 1956

2,733,567

FLUIDTIGHT WATCH CROWN CONSTRUCTION

Conrad Zellweger, Pregny, Geneva, Switzerland, assignor to La Nationale S. A., Geneva, Switzerland, a company of Switzerland Application March 12, 1953, Serial No. 341,884

Claims priority, application Switzerland December 26, 1952

4 Claims. (Cl. 58—90)

My invention has for its object a control member for the fluidtight control of a time-piece, said control member being constituted for instance by the crown associated with a watch-winding stem or by a push-piece.

A large number of arrangements have already been designed for providing fluidtightness in crowns and push-pieces by means of sealing members acting radially and axially through their clamping between opposite walls. Such packings or the like sealing members show the drawback of making the movements of the part sealed thereby more difficult, by reason of the clamping action thus exerted and, on the other hand, fluidtightness cannot be ensured for any long duration, as a consequence of the frictional wear to which the sealing members are submitted.

My invention has for its object to remove the above-mentioned drawbacks and it provides for fluidtightness of the passage of the controlling part through the wall of the time-piece case by resorting to at least one packing constituted by a washer of yielding elastic material held fluidtightly along one of its edges while acting through its radially free opposite edge, which is deformed in an axial direction in a manner such as to ensure through axial pressure the fluidtightness of the opening in the body of the time-piece case, the elasticity of the packing being sufficient for an axial shifting of the crown to be possible, without any breaking of the seal being produced thereby.

Figure 1:
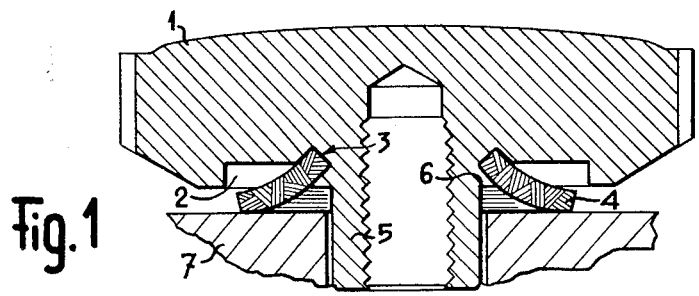
Figure 3:
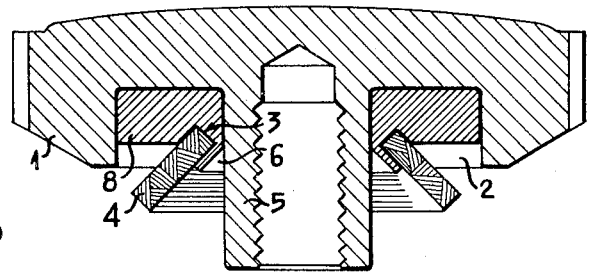
Figure 4:
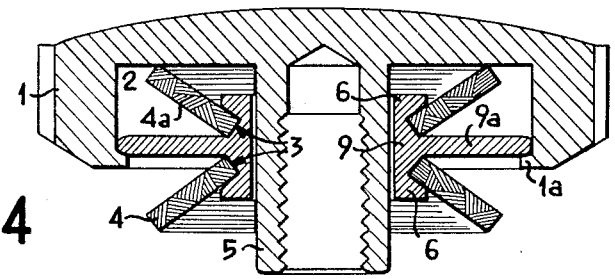
Figure 2:
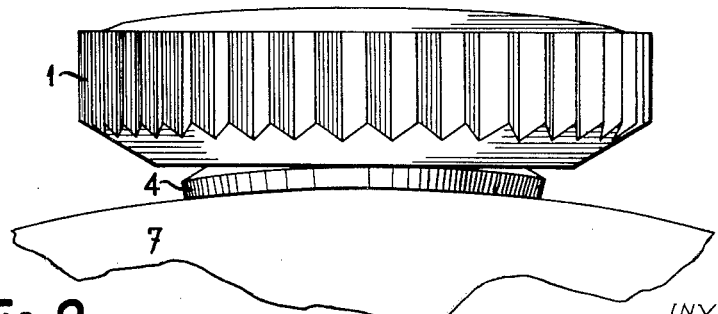

I have illustrated by way of example in accompanying diagrammatic drawings various embodiments of my invention, as applied to a watch winding crown. In said drawings:

Fig. 1 is an axial sectional view of a first embodiment;
Fig. 2 is an elevational view thereof;
Figs. 3 and 4 are cross-sections similar to that of Fig. 1 showing two further embodiments.

Fig. 1 shows that the crown 1 is provided on its inner surface with a recess 2 along the inner periphery of which is formed a groove 3 the walls of which constitute a bearing for the inner edge of the annular packing 4. On the tubular stem or pipe 5, rigid with the crown, is retained a small outwardly projecting flange 6 forming a bearing for the inner surface of the packing 4. The latter is constituted by a flat washer of yielding elastic material adapted to be readily deformed, such as natural or synthetic rubber, the central opening in which washer has a diameter that is smaller than that of the pipe 5 of the crown, while the outer diameter of the washer is smaller than that of the recess 2. This results in that the washer, when fitted inside the groove 3, assumes immediately a frustoconical shape and bears elastically through its free edge against the outer surface of the actual case 7 after positioning of the crown on the latter.

It is apparent that the joint between the winding pipe and the watch case at the point at which the former passes through the latter, is closed fluidtightly on one hand by the clamping of the packing 4 inside the groove 3 in the crown, and, on the other hand, by the elastic contact between the free edge of said packing and the outer surface of the casing 7.

As apparent from inspection of Fig. 2, the free edge of the packing matches exactly the shape of the surface of the case 7 and it is obvious that the crown may be shifted axially, for instance when it is desired to make it enter its time-setting position without this breaking the seal between the case 7 and the packing 4.

The modification illustrated in Fig. 3 shows a member 8 fitted inside the bottom of the recess 2 in the crown 1. The bearing formed in the device of Fig. 1 by a groove in the actual crown is formed in the present case by a groove in said member 8 and the inner surface of the packing 4 bears against a small frustoconical ring-shaped part 6.

This embodiment shows the advantage of allowing a machining of the groove 3 and of the ring 6 before introducing said member 8 inside the crown.

In the further embodiment illustrated in Fig. 4, the crown 1 is recessed at 2 as in the preceding embodiments, but the fluidtightness is ensured by two packings 4 and 4a. These two packings constituted by yielding elastic washers, are mounted on a sleeve 9 sliding over the pipe 5 and provided with an outer flange or disc 9a, the diameter of which corresponds substantially to that of the recess 2 in the crown. The sleeve 9 is thus adapted to move freely in an axial direction over the pipe 5, but its outward movement out of the recess 2 is bounded by an annular inner flange 1a formed in register with the outer wall of the recess 2 along the surface of the recessed crown 1 facing the watch case 7. The socket or sleeve 9 is provided, furthermore, to either side of the disc 9a with grooves 3 in which are fitted the inner edges of the packings 4 and 4a extending along frustocones of opposite directions, the sides of the grooves 3 forming bearings for the corresponding packings.

It is apparent that the fluidtightness of the opening provided on the watch case for the passage therethrough of the winding pipe is ensured, on one hand, by the packing 4a the free outer edge of which engages the bottom of the recess 2 in the crown and, on the other hand, by the packing 4 contacting through its free edge with the watch case, which is not illustrated.

After positioning the crown 1, the packings 4 and 4a are elastically deformed, as disclosed with reference to Fig. 1.

Except for Figs. 1 and 2, the crowns and packings associated therewith are all shown in their outer positions with reference to the body of the case 7, which positions correspond to time setting. It is, therefore, obvious that when the crowns are urged inwardly with the packing into their winding-up positions, this increases the elastic deformation of the packings and consequently the pressure exerted against the parts engaged by their free edges. Consequently, fluidtightness is never broken with such packings.

According to the present invention, the packings are always constituted by washers assuming naturally a flat shape, that are comparatively thin and that are elastically deformed when they are being fitted over the crown or after the latter has been positioned on the time-piece. The packings are always held fast by one of their edges while the other edge of each packing, which is radially free, exerts an axial thrust due to its elastic deformation, which ensures fluidtightness.

The deformation of the washer during its mounting is obtained for instance by fitting it over a part having a diameter that is larger than that of the central opening of the washer. In this case, it assumes, as illustrated in the drawings, a frustoconical shape.

It will be readily apparent that the means disclosed and illustrated and providing the fluidtightness of a winding crown, are applicable as well as any outer control member for a time-piece, such as a push-piece for instance.

What I claim is:

1. In a watch construction the combination with a watchcase having a radial stem opening comprising a control crown, a tube rigid with the crown and extending axially thereof through the case opening and displaceable with the crown between two limiting positions, the crown having on its side facing the case an annular recess and containing annular seating means, sealing washer means of resilient material with an opening of smaller cross-section than the cross-section of the seating means and when separated from the seating means having a flat shape and when assembled on the seating means distorted thereby to frustoconical shape and in the two limiting positions sealingly engaging with its outer peripheral zone the case in fluidtight relation.

2. The combination according to claim 1 and wherein the seating means includes a conical groove provided in the bottom of the recess adjacent the inner periphery thereof.

3. The combination according to claim 1 and wherein the seating means includes a conical groove provided in an annular member in the recess.

4. In a watch construction the combination with a watchcase having a radial stem opening comprising a control crown, a tube rigid with the crown and extending axially thereof through the case opening and displaceable with the crown between two limiting positions, the crown having on its side facing the case an annular recess and an annular seating groove, sealing washer means of resilient material with an opening of a cross-section smaller than the cross-section between the groove bottom and when separated from the seating groove having a flat shape and when assembled in the seating groove distorted thereby to frustoconical shape and in the two limiting positions sealingly engaging with its outer peripheral zone the case in fluidtight relation.

References Cited in the file of this patent

UNITED STATES PATENTS

| | | |
|---|---|---|
| 2,237,860 | Bolle | Apr. 8, 1941 |
| 2,497,935 | Feurer | Feb. 21, 1950 |